United States Patent [19]
Birk

[11] Patent Number: 4,567,974
[45] Date of Patent: Feb. 4, 1986

[54] FRICTION CLUTCH

[75] Inventor: Albert Birk, Bühl, Fed. Rep. of Germany

[73] Assignee: Luk Lamellen und Kupplungsbau GmbH, Bühl, Fed. Rep. of Germany

[21] Appl. No.: 592,235

[22] Filed: Mar. 22, 1984

[30] Foreign Application Priority Data

Mar. 25, 1983 [DE] Fed. Rep. of Germany ....... 3311039
May 26, 1983 [DE] Fed. Rep. of Germany ... 8309019[U]
May 26, 1983 [DE] Fed. Rep. of Germany ....... 3347913

[51] Int. Cl.$^4$ ............................................. F16D 13/18
[52] U.S. Cl. ................. 192/70.18; 192/70.28
[58] Field of Search .................... 192/70.18, 70.28, 96, 192/109 R

[56] References Cited

U.S. PATENT DOCUMENTS 3,167,163  1/1965  Smirl et al. .................... 192/70.18
3,712,435  1/1973  Kraus ............................ 192/70.27

Primary Examiner—Stephen F. Husar
Attorney, Agent, or Firm—Peter K. Kontler

[57] ABSTRACT

A friction clutch wherein the pressure plate at one side of the clutch disc is axially movably connected with a cover by a set of leaf springs which are disposed at the outer side of the cover, namely at the side which faces the engine of the motor vehicle wherein the clutch is installed. The cover is driven by the crankshaft of the engine and has raised portions extending toward the engine and being riveted to the respective end portions of the leaf springs. The other end portions of the leaf springs are riveted to protuberances which are provided on the pressure plate and extend into openings provided therefor in the cover and alternating with the raised portions. The clutch plate is biased against the adjacent lining of the clutch disc by a diaphragm spring whose radially outermost portion reacts against the cover radially inwardly of the protuberances and which bears against the pressure plate in a region which is located somewhat inwardly of the radially outermost portion. The protuberances of the pressure plate need not extend radially outwardly beyond the peripheral surfaces of the linings on the clutch disc. The leaf springs transmit torque between the cover and the pressure plate and allow the latter to move axially into and from frictional engagement with the adjacent lining. The mounting of such leaf springs at the outer side of the cover contributes to compactness of the friction clutch, as considered in the radial direction of the linings.

28 Claims, 4 Drawing Figures

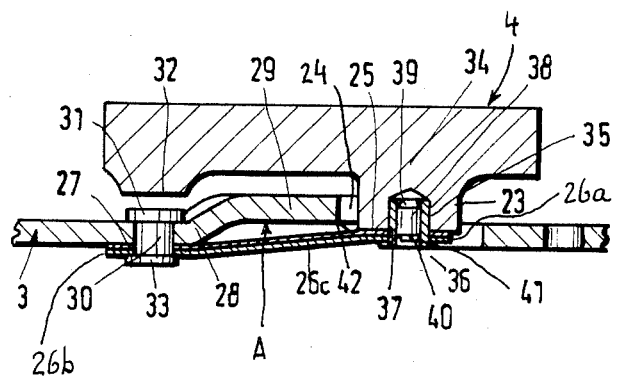

FRICTION CLUTCH

CROSS-REFERENCE TO RELATED CASE

The drawing of the present application is identical with FIGS. 1 to 4 in the commonly owned copending patent application Ser. No. 593,624 filed Mar. 26, 1984 for "Friction Clutch" by Lothar Huber.

BACKGROUND OF THE INVENTION

The present invention relates to friction clutches in general, especially to friction clutches for use in motor vehicles. More particularly, the invention relates to improvements in friction clutches of the type wherein a cup- or disc-shaped support can receive torque from the crankshaft of the engine in a motor vehicle to transmit torque to a pressure plate as well as to a counterpressure plate and wherein the pressure plate is movable axially of the support toward and away from the counterpressure plate into and from frictional engagement with the corresponding lining of the clutch disc. The latter is installed between the two plates and has a second lining which bears against the counterpressure plate when the pressure plate is moved axially and away from the support whereby the clutch disc receives torque and can drive the input element of a change-speed transmission or the like. The pressure plate is normally biased axially toward the clutch disc by a diaphragm spring which reacts against the support.

As a rule, the pressure plate of the above outlined friction clutch is connected with the support by several preferably equidistant leaf springs which ensure that the pressure plate shares all angular movements of the support but is free to move axially toward and away from the clutch disc. The counterpressure plate is normally secured to and rotates with but cannot move axially of the support. One end portion of each leaf spring is connected to a discrete projection of the pressure plate which extends radially outwardly of the linings of the clutch disc, and the other end portion of each leaf spring is connected to a discrete projection which is provided on the support and also extends radially outwardly beyond the linings of the clutch disc. This contributes significantly to the space requirements of the clutch, as considered in the radial direction of the clutch disc and its linings. Moreover, the maximum diameters of the linings are limited because the linings must be disposed radially inwardly of the projections on the pressure plate and the support; otherwise, the leaf springs would interfere with proper operation of such conventional clutches.

OBJECTS AND SUMMARY OF THE INVENTION

An object of the invention is to provide a novel and improved friction clutch which can be utilized with particular advantage in motor vehicles and which is constructed and assembled in such a way that its space requirements (especially as considered in the radial direction) are a fraction of those of a conventional friction clutch having friction linings with the same outer diameters.

Another object of the invention is to provide a friction clutch wherein the friction linings can extend radially outwardly much closer to the radially outermost portions of the clutch than in heretofore known friction clutches.

A further object of the invention is to provide a friction clutch which, in addition to being surprisingly compact, as considered in the radial direction, is also shorter (as considered axially) than many heretofore known friction clutches.

Still another object of the invention is to provide a friction clutch wherein the space between the cover and the counterpressure plate is utilized with greater economy and greater efficiency than in heretofore known clutches.

An additional object of the invention is to provide a friction clutch which is more compact and hence more economical than heretofore known clutches and which is more reliable than the conventional clutches.

Another object of the invention is to provide a novel and improved method of assembling various components of a friction clutch for use in motor vehicles or the like.

An additional object of the invention is to provide a friction clutch which can employ surprisingly large friction linings in a relatively small space and wherein the transmission of torque between various rotary parts takes place in a novel and improved way.

A further object of the invention is to provide the friction clutch with novel and improved means for facilitating the assembly of its constituents and with novel and improved means for reliably securing the torque transmitting components to the parts which are attached thereto.

The invention is embodied in a friction clutch, particularly for use in motor vehicles, which comprises a substantially disc- or cup-shaped rotary support adapted to receive torque from the output element (particularly from the crankshaft) of an internal combustion engine and having an inner side facing away as well as an outer side facing toward such engine, an axially movable pressure plate which is adjacent to the inner side of the support, a diaphragm spring which is interposed between the pressure plate and the support and has an outer radial portion (as considered in the radial direction of the pressure plate) reacting against the support and a radially inner portion bearing against the pressure plate, and means for transmitting torque between the support and the pressure plate. Such torque transmitting means comprises a plurality of leaf springs (e.g., three or more equidistant springs, as considered in the circumferential direction of the pressure plate) each having a first portion secured to the pressure plate and a second portion secured to the support. At least a portion of each leaf spring is disposed at the outer side of the support. Such clutch further comprises a flange or other suitable means for transmitting torque between the crankshaft (output element) of the engine and the support, a counterpressure plate, distancing means for rigidly (axially movably and non-rotatably) securing the counterpressure plate to the support, and a clutch disc which is interposed between the pressure plate and the counterpressure plate.

In accordance with a feature of the invention, the pressure plate comprises a plurality of axially extending protuberances and the support has openings for such protuberances. Each protuberance has an end face turned toward the engine and the first portions of the leaf springs are attached to such end faces of the corresponding protuberances. The fastener means for securing the first portions of the leaf springs to the corresponding protuberances can comprise a set of rivets, and a second set of rivets can constitute the fastener means which secure the second portions of the leaf springs to the support.

The clutch disc comprises two annular friction linings one of which is adjacent to the counterpressure plate and the other of which is adjacent to the pressure plate. In accordance with another feature of the invention, at least the major part of each protuberance on the pressure plate is disposed radially inwardly of the linings, i.e., radially inwardly of the radially outermost portions of such linings. This contributes to compactness of the friction clutch, as considered in the radial direction of the pressure plate. The radially outer portion of the diaphragm spring is disposed radially inwardly of the protuberances. The second portions of the leaf springs are preferably secured to the outer side of the support; this ensures that the exposed side of each and every leaf spring faces toward the engine which drives the support. The latter is preferably provided with an annulus of raised portions extending substantially axially and away from the pressure plate and recessed portions which alternate with the raised portions and extend axially toward the pressure plate. The second portion of each leaf spring is preferably secured to the outer side of a discrete raised portion and each recessed portion is provided with one of the aforementioned openings for the respective protuberance of the pressure plate. Such arrangement contributes to compactness of the friction clutch, as considered in the axial direction of the pressure plate and the clutch disc. This is due to the fact that the first portions of the leaf springs are secured to the pressure plate in the regions of the respective recessed portions of the support.

The outer side of the support has sections which are adjacent to third portions of the leaf springs between the respective first and second portions; such third portions are arranged to abut against the respective sections of the outer side of the support in response to axial movement of the pressure plate away from the inner side of the support and through a predetermined distance. Thus, each section of the outer side of the support is calibrated to be contacted by the respective leaf spring in response to a predetermined axial movement of the pressure plate in a direction toward the counterpressure plate.

The pressure plate is preferably provided with a platform for each rivet which secures the second portion of a leaf spring to the support. The normal distance between the head of each such rivet and the respective platform (in engaged condition of the clutch) should suffice to allow for movement of the pressure plate away from and out of frictional engagement with the respective lining of the clutch disc. The levels of the platforms are selected in such a way that the pressure plate has ample room for disengagement from the respective lining even if the linings of the clutch disc are new (i.e., free of wear) and also if not only the linings but also the counterpressure plate and the pressure plate are practically or completely devoid of wear.

The friction clutch is preferably further provided with means for centering the distancing means on the support. Such centering means can comprise a pin which is parallel to the axis of the pressure plate and is preferably closely adjacent to the second portion of one of the leaf springs. The pin is preferably anchored in and extends to the outer side of the support and it also extends into a radially extending slot or into a round hole of the distancing means; that portion of the pin which extends to the outer side of the support is preferably at least partially overlapped by a part of the adjacent leaf spring. The centering pin is preferably adjacent to one of the rivets which connect the second portions of the leaf springs to the support. Alternatively, one of the rivets which connect the second portions of the leaf springs to the support can include a pin-shaped extension which constitutes the centering means for the distancing means with reference to the support.

The means for securing the first portions of the leaf springs to the protuberances of the pressure plate preferably comprises rivets each of which is partially embedded in the respective protuberance. To this end, each protuberance is formed with a blind bore bounded by a non-cylindrical (corrugated, grooved, threaded, ribbed or analogous) surface, and each rivet comprises a tubular member which extends into the respective blind bore and at least a portion of the exterior of which is in form-locking engagement with the surface bounding the respective bore. Thus, the profiling of surfaces surrounding the blind bores is or can be complementary to the profiling of the exterior of the respective tubular members to thus prevent extraction of such members from the corresponding blind bores. Each such rivet can further comprise an insert which is driven into the respective tubular member and serves to prevent disengagement of the tubular member from the surface bounding the corresponding blind bore. Each such insert can comprise a stud having a first end portion tapering toward and being adjacent to the bottom of the respective blind bore. Each tubular member is preferably deformed at the outer side of the first portion of the respective leaf spring to form a head which overlies the corresponding first portion to prevent separation of the leaf spring from the respective protuberance. Each stud can have a second tapered end portion which is adjacent to the outer side of the first portion of the respective leaf spring and the head of the respective tubular member preferably overlies at least a part of such tapering second end portion to prevent accidental expulsion of the stud from the tubular member, i.e., to ensure reliable attachment of the first portion of the corresponding leaf spring to the pressure plate.

The novel features which are considered as characteristic of the invention are set forth in particular in the appended claims. The improved friction clutch itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a fragmentary sectional view as seen in the direction of arrows from the line III—III of FIG. 2; and FIG. 4 is a fragmentary sectional view of a detail in a modified friction clutch.

DESCRIPTION OF THE PREFERRED EMBODIMENTS

Figure 1:
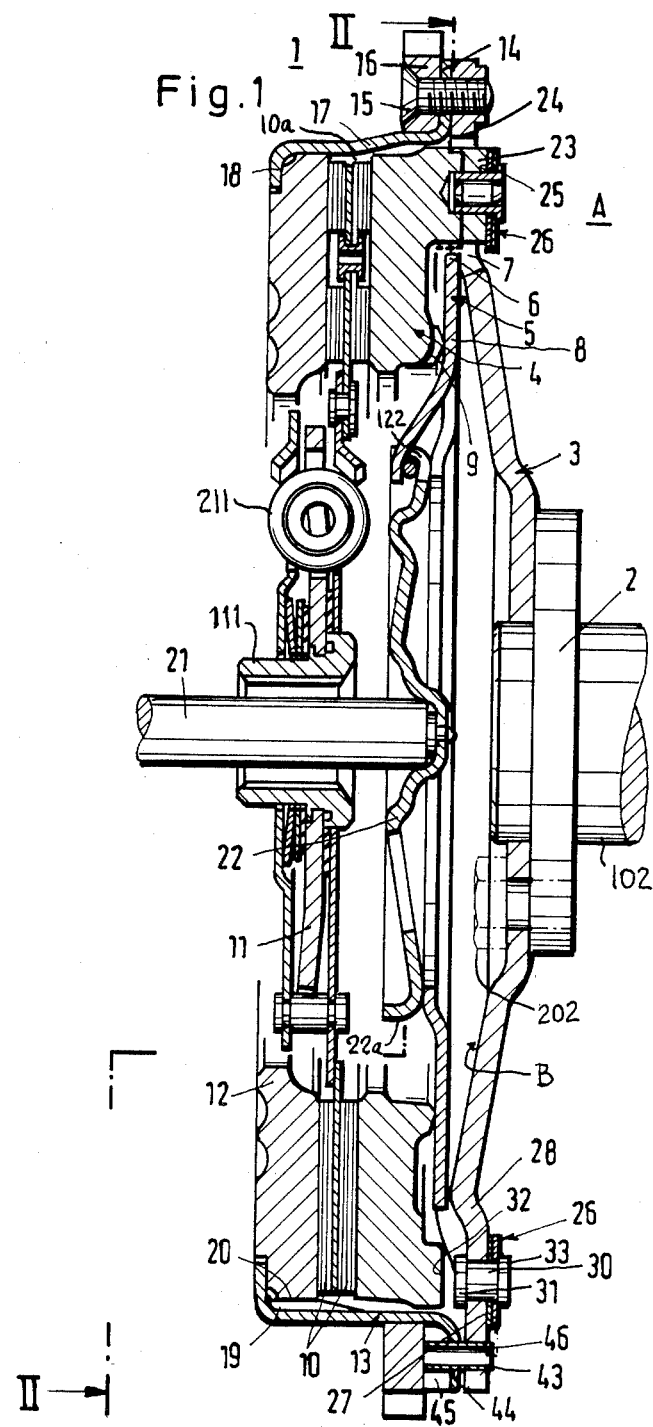
FIG. 1 is an axial sectional view of a friction clutch which embodies one form of the invention.
Figure 2:
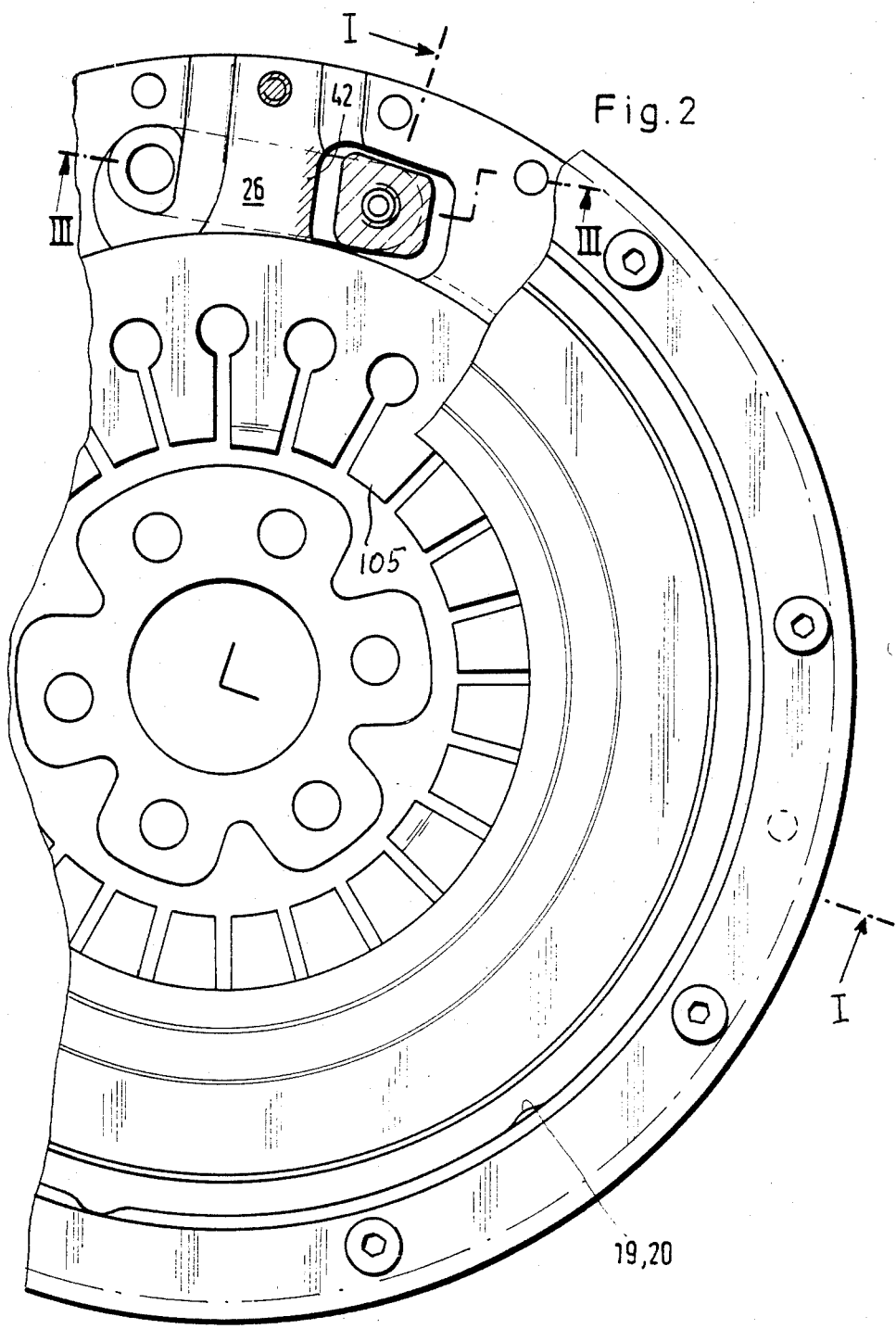
FIG. 2 is a fragmentary partly end elevational and partly sectional view as seen in the direction of arrows from the line II—II of FIG. 1.

Referring first to FIGS. 1, 2 and 3, there is shown a friction clutch 1 which is installed in a motor vehicle and has a disc-shaped annular cover or support 3 receiving torque from the output element 102 (e.g., crankshaft) of the internal combustion engine of the motor vehicle. The means for transmitting torque from the crankshaft 102 to the support 3 includes a flange 2 at the left-hand end of the crankshaft, as viewed in FIG. 1, and bolts 202 or analogous means for securing the central portion of the support 3 to the flange 102. The support 3 has an outer side A which faces toward and an inner side B which faces away from the engine including the crankshaft 102.

The friction clutch 1 further comprises an annular pressure plate 4 which is movable axially toward and away from the inner side B of the support 3, and an annular diaphragm spring 5 having a radially outer marginal portion 6 reacting against the adjacent projections 7 at the inner side B of the support 3 and a radially inner portion 8 abutting against projections 9 at the right-hand side of the pressure plate 4, as viewed in FIG. 1. The diaphragm spring 5 is installed in prestressed condition so that its radially inner portion 8 bears against the projections 9 and urges the pressure plate 4 in a direction to the left, as viewed in FIG. 1, namely toward frictional engagement with the right-hand annular friction lining 10 on a clutch disc 11 which is installed between the pressure plate 4 and a counterpressure plate 12 of the friction clutch 1. When the clutch 1 is engaged, the diaphragm spring 5 causes the pressure plate 4 to bear against the adjacent friction lining 10 and to thereby urge the other friction lining 10 of the clutch disc 11 against the adjacent side of the axially fixed counterpressure plate 12. The clutch disc 11 then transmits torque to a hub 111 which is connected to the input element of a change-speed transmission in the motor vehicle. The transmission of torque from the linings 10 to the hub 111 takes place, at least during certain stages of operation of the clutch 1, through the medium of energy storing elements in the form of coil springs 211 of which only one can be seen in FIG. 1.

The counterpressure plate 12 is fixedly connected to the support 3 by a distancing device 13 which is a cupped annular member made of deformable sheet metal stock. The arrangement is such that the distancing device 13 maintains the counterpressure plate 12 at a preselected distance from the support 3 and also compels the plate 12 to share all angular movements of the support 3 when the latter is rotated by the crankshaft 102 of the engine. The radially outermost portion 14 of the distancing device 13 constitutes an outwardly flaring flange which is affixed to the radially outermost portion of the support 3 by screws 15 or other suitable fasteners. The fasteners 15 further serve to connect the support 3, the distancing device 13 and the counterpressure plate 12 with a ring gear 16 whose teeth extend radially outwardly beyond the peripheral surfaces of the support 3 and flange 14. The internal surface of the ring gear 16 is preferably a press fit on the external surface of the substantially axially extending central portion 17 of the distancing device 13; this centers the distancing device and enhances its resistance to deformation. The radially innermost portion of the distancing device 13 is a ring-shaped collar 18 recessed into a complementary annular socket in that side of the counterpressure plate 12 which faces away from the clutch disc 11 and pressure plate 4. The collar 18 may constitute a circumferentially complete member or it may comprise an annulus of discrete prongs each of which is bent to extend into the corresponding socket at the exposed side of the counterpressure plate 12. The peripheral surface of the counterpressure plate 12 is preferably a press fit in the adjacent part of the tubular central portion 17 of the distancing device 13 so that the latter holds the plate 12 against axial movement toward the support 3. Still further, the tubular central portion 17 of the distancing device 13 preferably serves to hold the counterpressure plate 12 against rotation relative to the support 3, especially if the collar 18 is a circumferentially complete member which cannot prevent rotation of the plate 12 with reference to the support. As shown in the lower portion of FIG. 1, the periphery of the counterpressure plate 12 is provided with substantially axially parallel grooves or flutes 20 (only one of these grooves is actually shown) for complementary axially parallel ribs 19 of the central portion 17 of the distancing device 13. The grooves 20 and the ribs 19 need not be parallel to the common axis of the central portion 17 and counterpressure plate 12; this even further reduces the likelihood of axial movability of the plate 12 in the distancing device 13.

The means for disengaging the clutch 1 comprises a centrally located plunger 21 which extends with clearance through the hub 111 of the clutch disc 11 and can pivot the diaphragm spring 5 at 6, 7 through the medium of a motion transmitting disc 22 having a radially outermost portion 22a abutting against the tips of the radially inwardly extending fingers or prongs 105 (see FIG. 2) of the diaphragm spring 5. When the plunger 21 is moved in a direction to the right, as viewed in FIG. 1, the disc 22 causes the radially inner portion 8 of the diaphragm spring 5 to move away from the counterpressure plate 12 so that the pressure plate 4 can move axially toward the inner side B of the support 3 and to thereby relax the pressure upon the adjacent friction lining 10. This results in disengagement of the linings 10 from the plates 4, 12 so that the crankshaft 102 can rotate with reference to the hub 111. The pressure plate 4 is biased axially of and away from the counterpressure plate 12 by a set of torque transmitting leaf springs 26 each of which has a first portion 26a secured to the pressure plate 4 and a second portion 26b secured to the support 3. The bias of the leaf springs 26 is weaker than the bias of the diaphragm spring 5 when the latter is free to urge the pressure plate 4 toward the counterpressure plate 12 so that the clutch 1 is automatically engaged against the opposition of the leaf springs 26 as soon as the plunger 21 is retracted in a direction to the left, as viewed in FIG. 1.

The pressure plate 4 is formed with an annulus of preferably equidistant protuberances 23 (as considered in the circumferential direction of the support 3) which extend axially through complementary openings or cutouts 24 in the support 3. The protuberances 23 are disposed radially outwardly of the radially outer marginal portion 6 of the diaphragm spring 5 and at least the major portion of each protuberance 23 is disposed radially inwardly of the peripheral or outer marginal portions 10a of the linings 10 of the clutch disc 11. This contributes to compactness of the friction clutch 1 because the first portions 26a of the leaf springs 26 are connected to discrete protuberances 23, i.e., such first portions 26a of the leaf springs need not extend radially outwardly beyond the friction linings 10. Each protuberance 23 has a flat end face or platform 25 which constitutes an abutment for the first portion 26a of the respective leaf spring 26.

In accordance with an advantageous feature of the present invention, at least a portion of each leaf spring 26 is outwardly adjacent to the outer side A of the support 3. In the embodiment of FIGS. 1 to 3, each of the leaf springs 26 is mounted in its entirety at the outer side A of the support 3, i.e., the exposed sides of the leaf springs 26 face the engine which includes the crankshaft 102. In other words, the leaf springs 26 need not extend into the space or chamber between the inner side B of the support 3 and the counterpressure plate 12. The second portion 26b of each leaf spring 26 is secured to the outer side A of the support 3. The latter comprises an annulus of raised portions 28 extending in the axial direction of the clutch 1 and away from the pressure plate 4 and alternating with recessed portions 29 extending axially of the clutch but in a direction toward the pressure plate 4. The first portions 26a of the leaf springs 26 are secured to the respective protuberances 23 in the regions of the recessed portions 29, and the second portions 26b of the leaf springs 26 are secured to the outer sides of the respective raised portions 28. The aforediscussed openings 24 of the support 3 are provided in the recessed portions 29.

The fastener means which is used to secure the second portions 26b of the leaf springs 26 to the raised portions 28 of the support 3 comprises rivets 30. Each of these rivets has a head 31 which is disposed at the inner side B of the support 3 and is in register with a discrete flat platform 32 at the respective side of the axially movable pressure plate 4. Each of these platforms serves as an anvil for the making of the respective rivet head 31. Alternatively, each rivet 30 can be provided with a prefabricated head 31 which abuts against the respective platform or anvil 32 during the making of the other head 33 at the outer side A of the support 3. If the head 33 is formed prior to securing of the respective rivet 30 to the support 3, the head 31 is formed as a result of pressing of the partially finished rivet 30 against the respective platform 32. Irrespective of the exact nature of the riveting operation, the distance between each finished or prefabricated rivet head 31 and the respective platform 32 is such that the pressure plate 4 has adequate room for movement away from the counterpressure plate 12 irrespective of the degree of wear upon the plates 4, 12 and linings 10, i.e., also when the clutch 1 is new.

The first portions 26a of the leaf springs 26 are secured to the respective protuberances 23 of the pressure plate 4 by special rivets 34 of the type shown in the upper portion of FIG. 1 and in FIG. 3. To this end, each of the protuberances 23 is provided with a blind bore 35 bounded by an undulate, threaded or otherwise profiled surface which is engaged by the complementary outer surface 37 of a plastically deformed tubular member 36 constituting or forming part of the respective rivet 34. Prior to deformation of its outer end portion, each tubular member 36 extends outwardly beyond the exposed side of the first portion 26a of the respective leaf spring 26. This is indicated in FIG. 3 by phantom lines. A spreading element or insert in the form of a cylindrical stud 38 is then introduced into the axial bore of the tubular member 36 to expand the latter into full surface-to-surface engagement with the respective protuberance 23 and to thus anchor such tubular member in the pressure plate 4. The inner diameter of the undeformed (i.e., unexpanded) tubular member 36 is smaller than the diameter of the respective stud 38 to thus ensure predictable and reliable expansion of the tubular member so that the configuration of its external surface invariably conforms to the configuration of the surface bounding the respective bore 35. The innermost or front end portion 39 of the stud 38 tapers toward the bottom of the respective blind bore 35 so that the stud 38 can be readily introduced into the corresponding tubular member 36. Each stud 38 is preferably further provided with a second tapering end portion or tip 40 which tapers in a direction away from the bottom of the respective blind bore 35 and is at least partially embedded in the material of the corresponding tubular member 36 when the latter is deformed at the outer side of the first portion 26a of the respective leaf spring 26 so as to resemble a head 41 which not only overlies the outer side of the respective leaf spring 26 but also completely or partially confines the corresponding tip 40 to thus prevent accidental expulsion of the stud 38 from the bore of the associated tubular member 36.

The rivets 34 can be replaced with screws or bolts which are driven home into the blind bores 35 of the protuberances 23. The utilization of the illustrated rivets 34 is preferred at this time because they are simple to install, compact and inexpensive.

The end portions or tips 39 and 40 of the inserts or studs 38 can have a pyramidal, conical, semispherical or analogous shape, as long as they allow for convenient introduction of the inserts into the respective tubular members 36 and as long as they can be readily embedded in the material of the respective heads 41 when the outer end portions of the corresponding tubular members 36 undergo deformation to overlie the outer sides of the first portions 26a of the corresponding leaf springs 26. The heads 41 can be formed simultaneously with forcible introduction of inserts 38 into the respective tubular members 36 or in a subsequent step. The end portions 40 of the inserts 38 can be partially or completely embedded in the material of the respective heads 41.

Those sections (42) of the outer side A of the support 3 which are outwardly adjacent to the recessed portions 29 and are overlapped by the third or median portions 26c of the corresponding leaf spring 26 are calibrated so as to allow for requisite axial movements of the pressure plate 4 toward and away from the counterpressure plate 12. The levels of the sections 42 are selected in such a way that they can be contacted by the third portions 26c of the adjacent leaf springs 26 only when the wear upon the pressure plate 4 and the lining or linings 10 of the clutch disc 11 has progressed to the maximum permissible value. Each of the sections 42 is immediately or closely adjacent to the respective rivet 34, i.e., to the respective protuberance 23 of the pressure plate 4. As a rule, the wear upon the linings 10 will be most pronounced and the levels of the calibrated sections 42 are selected with a view to enable the median portions 26c of the leaf springs 26 to bear against such sections 42 only when the wear upon the linings 10 has progressed all the way or close to the maximum permissible value. On the other hand, the selection of the levels of the calibrated sections 42 should be such as to prevent excessive stretching of the leaf springs 26 at the time the support 3 is still assembled only with the pressure plate 4 and diaphragm spring 5. It will be recalled that the diaphragm spring 5 is installed in prestressed condition so that it automatically moves the pressure plate 4 away from the inner side B of the support 3 as soon as the parts 3, 4 and 5 are assembled but the counterpressure plate 12 is yet to be secured to the support 3 by the distancing device 13.

The calibrated sections 42 of the outer side A of the support 3 also prevent excessive stretching and/or other types of deformation of the leaf springs 26 during storage and/or transport of prefabricated units each of which includes the support 3, the pressure plate 4, the prestressed diaphragm spring 5 between the parts 3, 4 and the leaf springs 26 as well as the rivets 30, 34 which secure the leaf springs to the support and pressure plate. Still further, such calibrated sections 42 protect the leaf springs 26 during assembly of the just described units with the remaining parts of the friction clutches as well as subsequent to attachment of a unit including the parts 3, 4, 5, 26, 30, 34 to the crankshaft 102 but prior to attachment of the distancing device 13 and counterpressure plate 12 to the support 3. Calibration of all sections 42 of the outer side A of the support 3 is desirable and advantageous in order to reliably prevent excessive stretching of the leaf springs 26 under the aforeenumerated circumstances as well as to ensure that the diaphragm spring 5 will stress each of the leaf springs 26 to the same extent.

In order to facilitate assembly of the friction clutch 1, and particularly the attachment of the distancing device 13 to the support 3, the clutch comprises at least one orienting or centering pin 43 which is mounted in the support 3 and can be received in a properly dimensioned opening 44 of the flange 14 of the distancing device 13. The latter is assembled with the support 3 subsequent to insertion of the counterpressure plate 12 into its interior and subsequent to placing of the clutch disc 11 between the plates 4 and 12. The opening 44 need not be circular but may constitute an elongated closed slot extending radially of the support 3 and having a width which matches or only slightly exceeds the diameter of the centering pin 43. The opening 44 is machined into or otherwise formed in a pocket-like raised portion 45 of the flange 14 of the distancing device 13. The portion 45 extends in a direction toward the inner side B of the support 3, i.e., toward the engine which includes the crankshaft 102. Such portion 45 is received in the respective raised portion 28 of the support 3. The centering pin 43 is received in a sleeve 46 which is anchored in the respective raised portion 28 and extends into the opening 44 of the raised portion 45 of the flange 18 on the distancing device 13. As indicated in the lower portion of FIG. 1 by phantom lines, a part 27 of the second portion 26b of the respective leaf spring 26 can overlie the outer end face of the sleeve 46 and/or centering pin 43 so as to prevent accidental expulsion of the part 43 and/or 46 during assembly of the friction clutch 1.

The distancing device 13 need not necessarily constitute a separately manufactured part which is thereupon assembled with the support 3 and counterpressure plate 12. For example, the illustrated distancing device 13 can be replaced with integral extensions or prongs of the counterpressure plate 12, especially if the latter is a casting made of gray iron, spheroidal graphite cast iron or the like. Alternatively, the illustrated distancing device 13 can be replaced with a ring which is inserted between the support 3 and the counterpressure plate 12. The illustrated distancing device 13 is preferred at this time because the presently preferred mode of assembling the friction clutch 1 is as follows: The support 3 is assembled with the pressure plate 4, prestressed diaphragm spring 5 and leaf springs 26 into a prefabricated unit which is secured to the flange 2 of the crankshaft 102 by means of the aforedescribed bolts 202. In the next step, the radially outermost portion 22a of the clutch-disengaging disc 22 is secured to the prongs 105 of the diaphragm spring 5, as at 122. In a further step, the clutch disc 11 is placed adjacent to the pressure plate 4 and the distancing device 13, with the counterpressure plate 12 already installed therein, is then secured to the support 3 by means of screws 15. The centering pin 43 facilitates proper orientation of the distancing device 13 relative to the support 3 during application of the screws 15. More than one centering pins can be used if desired or necessary.

FIG. 4 shows a portion of a modified friction clutch wherein at least one of the rivets 30 is replaced with a modified rivet 47 having a pin-shaped extension 49 constituting a centering pin and being received in a radially extending open slot 144 of the flange 14 of the distancing device 13. The rivet 47 has an intermediate head 48 which is disposed between the flange 14 and the inner side B of the support 3 and an outer head 50 which is outwardly adjacent to the second portion 26b of the respective leaf spring 26. That portion of the rivet 47 which is disposed between the heads 48, 50 extends through registering holes of the support 3 and leaf spring 26. The open slot 144 can be replaced with a radially extending closed slot (which terminates short of the peripheral surface of the flange 14) or with a circular opening without departing from the spirit of the invention. The provision of an open or closed radially extending centering slot for the centering pin 43 or 49 is preferred at this time because this allows for some radial displacement of component parts of the clutch when the ring gear 16 is forcibly applied to the exterior of the median portion of the distancing device 13. Such radial displacement can take place prior to attachment of the distancing device 13 to the support 3, i.e., at the time the parts 13 and 16 are assembled into a prefabricated unit which is then attached to the support 3. In either event, a radially extending centering slot allows for at least some compensation which is necessary due to minute distortion of the assembly of parts 13, 16 as a result of forcible mounting of the part 16 on the median portion 17.

As a rule, the intermediate head 48 will be formed prior to insertion of the major portion of the rivet 47 into the registering holes of the second portion 26b of the respective leaf spring 26 and of the support 3, and the head 50 is formed subsequent to such insertion. The friction clutch can comprise several rivets of the type shown in FIG. 4.

In the embodiment which is shown in FIGS. 1 to 3, each of the leaf springs 26 is installed, in its entirety, at the outer side A of the support 3. This renders it possible to greatly reduce the dimensions of the friction clutch 1, as considered in the radial direction of its rotary parts, because the support 3 and/or the pressure plate 4 need not be provided with radially outwardly extending projections or protuberances for attachment of the leaf springs 26 thereto. Instead, the protuberances 23 extend in the axial direction of the pressure plate 4 and at least the major part of each such protuberance can be located radially inwardly of the peripheral portions 10a of the friction linings 10. By providing the support 3 with openings 24 for the protuberances 23, it is further possible to reduce the dimensions of the friction clutch in the axial direction of the pressure plate 4. As can be readily seen in FIGS. 1 and 3, the first end portions 26a of the leaf springs 26 are adjacent to the respective end faces 25 which, in turn, are outwardly adjacent to the outer side A of the support 3; the second portions 26b of the leaf springs 26 are evidently and necessarily outwardly adjacent to the outer side A since they are attached to the outer sides of the respective raised portions 28 of the support 3; and the median portions 26c of the leaf springs 26 are outwardly adjacent to the sections 42 which form part of the outer side A. The axial dimensions of the friction clutch would have to be increased if the leaf springs 26 were installed at the inner side of the support 3, for example, as shown in FIG. 5 of U.S. Pat. No. 3,712,435 granted Jan. 23, 1973 to Kraus. The savings in space, as considered in the axial direction of the pressure plate 4, do not arise only due to the fact that the leaf springs 26 themselves are located at the outer side A of the support 3 but also because the rivets for such leaf springs need not be installed in the space between the pressure plate 4 and the support 3.

Another important advantage of the placing of portions of or the entire leaf springs 26 at the outer side A of the support 3 is that the leaf springs are subjected to much less pronounced thermal stresses which, in turn, reduces the losses in load due to set. This enhances the reliability of operation of the improved friction clutch and prolongs its useful life.

Still another important advantage of the improved friction clutch over conventional clutches wherein the leaf springs are disposed at the inner side of the support is that the outer diameter of the diaphragm spring 5 is not dependent at all or is less dependent upon the manner of mounting the leaf springs. Thus, at least the second portions 26b of the leaf springs 26 can be located, at least in part, radially inwardly of the portion 6 of the diaphragm spring 5.

Additional savings in space (as considered in the axial direction of the friction clutch 1) are achieved because the first portions 26a of the leaf springs 26 are secured to the raised portions 28 of the support 3 and because the latter has recessed portions 29 with openings 24 for the protuberances 23 of the pressure plate 4.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A friction clutch, particularly for use in motor vehicles, comprising a substantially disc-shaped rotary support arranged to receive torque from the output element of an engine and having inner and outer sides respectively facing away from and toward such engine; an axially movable pressure plate adjacent to the inner side of said support; a diaphragm spring interposed between said pressure plate and said support and having an outer portion, as considered radially of said pressure plate, reacting against said support and a radially inner portion bearing against said pressure plate; and means for transmitting torque between said support and said pressure plate, including a plurality of leaf springs each having a first portion secured to said pressure plate and a second portion secured to said support, at least a portion of each of said leaf springs being disposed at the outer side of said support.

2. The friction clutch of claim 1, further comprising a counterpressure plate, distancing means rigidly connecting said counterpressure plate with said support, and a clutch disc interposed between said pressure plate and said counterpressure plate.

3. The friction clutch of claim 1, further comprising means for transmitting torque between said support and an output element which constitutes the crankshaft of the engine in a motor vehicle.

4. The friction clutch of claim 1, wherein said pressure plate comprises a plurality of axially extending protuberances and said support has openings for such protuberances.

5. The friction clutch of claim 4, wherein each of said protuberances has an end face facing in the same direction as the outer side of said support, and further comprising fastener means for securing the first portion of each leaf spring to the end face of a discrete protuberance.

6. The friction clutch of claim 4, further comprising a counterpressure plate, distancing means fixedly connecting said counterpressure plate to said support, and a clutch plate having annular friction lining means interposed between said pressure plate and said counterpressure plate and having a radially outermost portion, at least the major part of each of said protuberances being disposed radially inwardly of said radially outermost portion of said friction lining means and further comprising fastener means for securing the first portion of each of said leaf springs to a discrete one of said protuberances.

7. The friction clutch of claim 6, wherein said outer portion of said diaphragm spring is disposed radially inwardly of said protuberances.

8. The friction clutch of claim 1, further comprising means for securing the second portions of said leaf springs to the outer side of said support.

9. The friction clutch of claim 1, wherein said support has an annulus of raised portions extending axially and away from said pressure plate and recessed portions alternating with said raised portions and extending axially toward said pressure plate, the second portion of each of said leaf springs being secured to a discrete one of said raised portions and the first portion of each of said leaf springs being secured to said pressure plate in the region of a discrete one of said recessed portions.

10. The friction clutch of claim 9, wherein each of said recessed portions has an opening and said pressure plate has protuberances extending into said openings, the first portion of each of said leaf springs being secured to a discrete protuberance of said pressure plate.

11. The friction clutch of claim 1, wherein the outer side of said support has sections adjacent to third portions of said leaf springs intermediate the respective first and second portions, said third portions of said leaf springs being arranged to abut against the respective sections of said outer side in response to axial movement of said pressure plate in a direction away from the inner side of said support.

12. The friction clutch of claim 11, wherein each of said sections is calibrated to be contacted by the third portion of the respective leaf spring in response to a predetermined axial movement of said pressure plate in a direction away from the inner side of said support.

13. The friction clutch of claim 1, further comprising rivets securing the second portions of said leaf springs to said support, each of said rivets having a head adjacent to said pressure plate and said pressure plate having flat platforms in axial alignment with the heads of said rivets.

14. The friction clutch of claim 13, further comprising a counterpressure plate, distancing means fixedly connecting said counterpressure plate to said support, and friction lining means interposed between said pressure plate and said counterpressure plate, said lining means and said plates being subject to wear and said pressure plate being movable axially toward and away from said counterpressure plate to thereby respectively clamp said lining means between and disengage said lining means from said plates, said platforms being spaced apart from the heads of the respective rivets through predetermined distances in the absence of wear upon said plates and/or said lining means and while said plates clamp said lining means therebetween.

15. The friction clutch of claim 1, further comprising a counterpressure plate, distancing means fixedly connecting said counterpressure plate to said support, friction lining means disposed between said plates and means for centering said distancing means on said support.

16. The friction clutch of claim 15, wherein said centering means comprises a pin which is parallel to the axis of said pressure plate and is closely adjacent to the second portion of one of said leaf springs.

17. The friction clutch of claim 16, wherein each of said pins extends to the outer side of said support and is at least partially overlapped by a part of the second portion of said one leaf spring.

18. The friction clutch of claim 15, further comprising rivets connecting the second portions of said leaf springs to said support, said centering means comprising a pin mounted in said support and adjacent to one of said rivets.

19. The friction clutch of claim 15, further comprising rivets connecting the second portions of said leaf springs to said support, one of said rivets including a portion constituting said centering means.

20. The friction clutch of claim 1, further comprising rivets for securing the first portions of said leaf springs to said pressure plate.

21. The friction clutch of claim 20, wherein said pressure plate comprises an annulus of protuberances, one for each of said leaf springs, and said support has openings for such protuberances, each of said rivets being embedded in a discrete protuberance.

22. The friction clutch of claim 21, wherein each of said protuberances has a blind bore bounded by a noncylindrical surface and each of said rivets comprises a tubular member extending into the respective blind bore, at least a portion of the exterior of each tubular member being in form-locking engagement with the surface bounding the respective bore.

23. The friction clutch of claim 22, wherein each of said surfaces is profiled to prevent extraction of the respective tubular member from the corresponding bore.

24. The friction clutch of claim 23, wherein at least some of said surfaces are provided with threads.

25. The friction clutch of claim 23, wherein each of said rivets further comprises an insert provided in the respective tubular member and arranged to prevent disengagement of such tubular member from the surface bounding the respective blind bore.

26. The friction clutch of claim 25, each of said inserts comprises a stud having an end portion tapering toward and adjacent to the bottom of the respective blind bore.

27. The friction clutch of claim 22, wherein each of said tubular members has a head overlying the first portion of the respective leaf spring.

28. The friction clutch of claim 22, wherein each of said rivets further comprises a stud provided in the respective tubular member and arranged to prevent disengagement of such tubular member from the surface bounding the respective bore, each of said studs having a tapered end portion adjacent to the first portion of the respective leaf spring and each of said tubular members having a head overlying the first portion of the respective spring and including a portion overlying the tapered end portion of the corresponding stud to thereby prevent removal of such stud from the interior of the corresponding tubular member.

* * * * *